(12) United States Patent
Lin

(10) Patent No.: US 6,824,353 B2
(45) Date of Patent: Nov. 30, 2004

(54) WATER TURBINE

(76) Inventor: Wen-Pin Lin, No. 30, Chien-Yung St., Tung Dist., Taichung City (TW)

( * ) Notice: Subject to any disclaimer, the term of this patent is extended or adjusted under 35 U.S.C. 154(b) by 50 days.

(21) Appl. No.: 10/326,490

(22) Filed: Dec. 19, 2002

(65) Prior Publication Data

US 2004/0120805 A1 Jun. 24, 2004

(51) Int. Cl.$^7$ .............................................. F01D 15/12
(52) U.S. Cl. ..................................... 415/124.1; 446/176
(58) Field of Search ......................... 415/122.1, 124.1, 415/203, 202, 204; 446/176

(56) References Cited

U.S. PATENT DOCUMENTS 6,007,402 A  * 12/1999  Nelson, II ................... 446/176

* cited by examiner

*Primary Examiner*—Edward K. Look
*Assistant Examiner*—Kimya N. McCoy
(74) *Attorney, Agent, or Firm*—Peacock Myers & Adams PC

(57) ABSTRACT

A water turbine includes a casing, a rotor, a primary drive shaft, a speed-reduction gear set, and an output drive unit. The casing confines a water compartment, and is formed with a water inlet for admitting pressurized water into the water compartment, and a water outlet for discharging the pressurized water from the water compartment. The rotor is mounted rotatably in the water compartment, and is driven rotatably by flow of the pressurized water from the water inlet through the water outlet. The primary drive shaft is coupled to and is co-rotatable with the rotor. The speed-reduction gear set is coupled to and is driven rotatably by the primary drive shaft. The output drive unit is coupled to and is driven rotatably by the speed-reduction gear set.

10 Claims, 4 Drawing Sheets

WATER TURBINE

BACKGROUND OF THE INVENTION

1. Field of the Invention

The invention relates to a water turbine, more particularly to a water turbine that is suitable for use with educational building blocks.

2. Description of the Related Art

Educational toys, such as building blocks, can encourage creativity and are thus popular among consumers. Moreover, the development of toys that can assist children in understanding the forces of nature is always a target sought by manufacturers.

At present, the power for driving toys built from building blocks comes mainly from batteries or solar energy. There is always a need to find other alternatives for driving such toys.

SUMMARY OF THE INVENTION

Therefore, the object of the present invention is to provide a water turbine that is suitable for use with educational building blocks.

Accordingly, the water turbine of this invention comprises:

- a casing that confines a water compartment and that is formed with a water inlet for admitting pressurized water into the water compartment, and a water outlet for discharging the pressurized water from the water compartment;
- a rotor mounted rotatably in the water compartment and driven rotatably by flow of the pressurized water from the water inlet through the water outlet;
- a primary drive shaft coupled to and co-rotatable with the rotor;
- a speed-reduction gear set coupled to and driven rotatably by the primary drive shaft; and
- an output drive unit coupled to and driven rotatably by the speed-reduction gear set.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
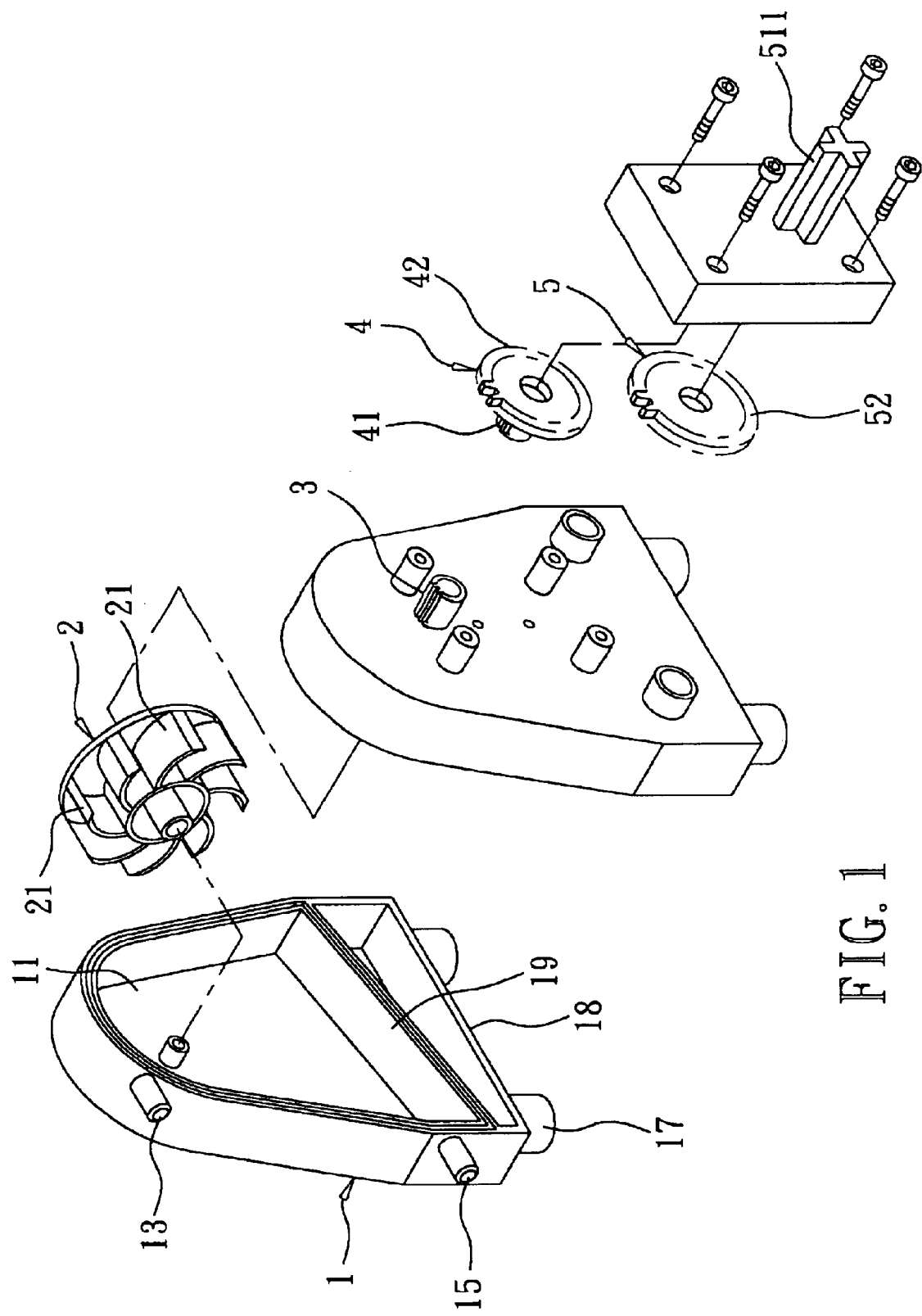
FIG. 1 is an exploded perspective of the preferred embodiment of a water turbine according to the present invention.
Figure 2:
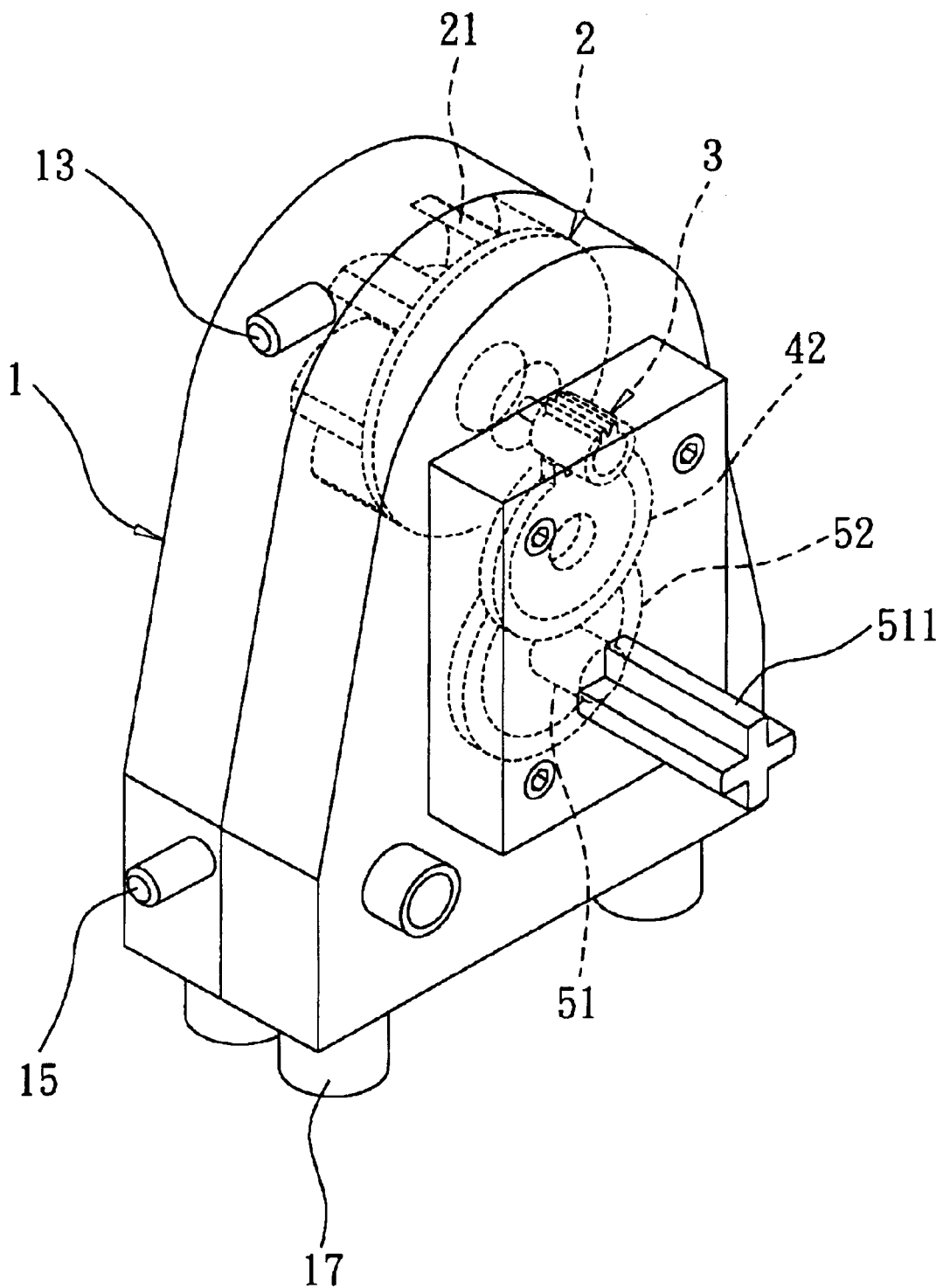
FIG. 2 is an assembled perspective view of the preferred embodiment.
Figure 3:
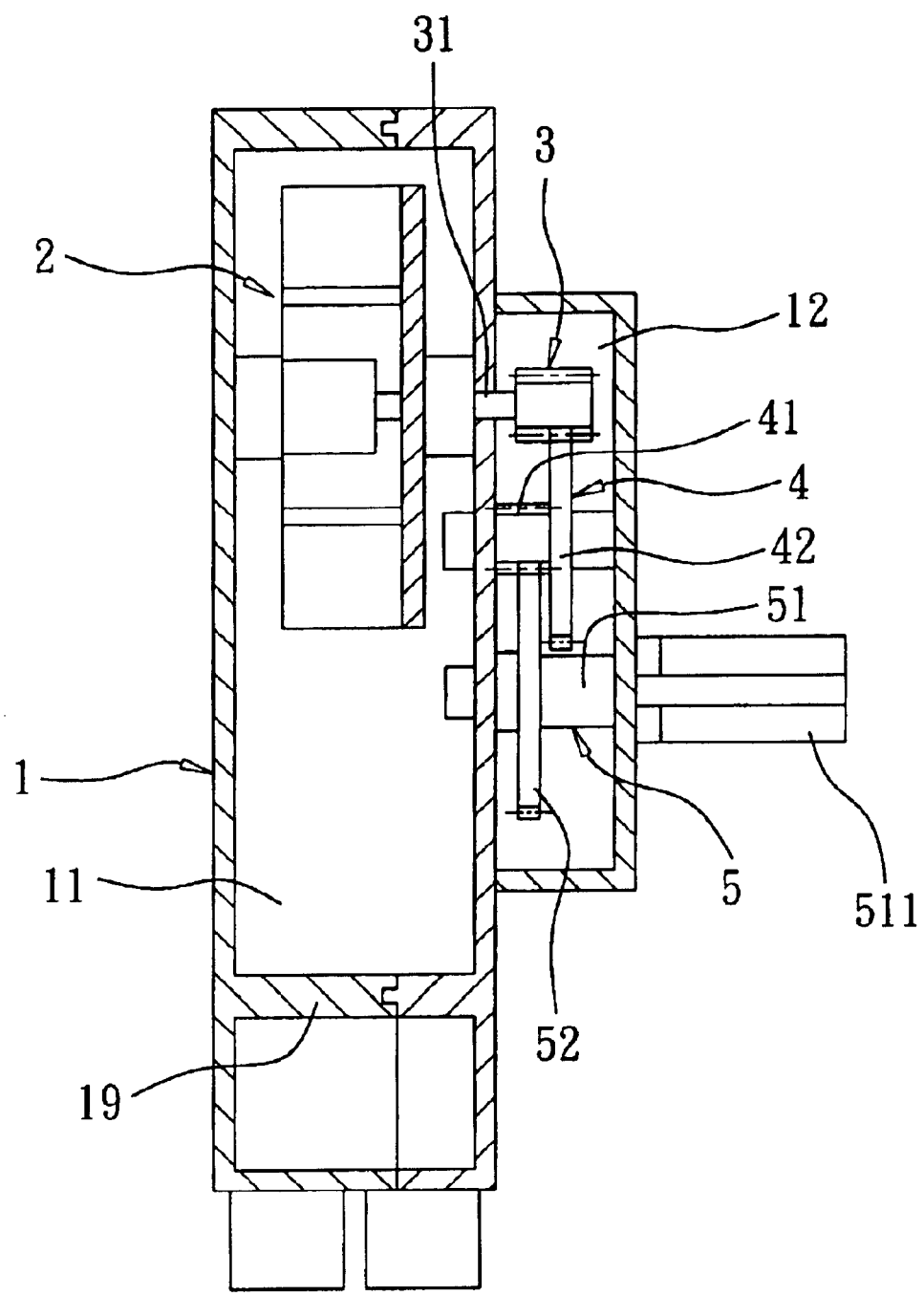
FIG. 3 is a schematic sectional view of the preferred embodiment.

Referring to FIGS. 1, 2 and 3, the preferred embodiment of a water turbine according to the present invention is shown to comprise a casing 1, a rotor 2, a primary drive shaft 3, a speed-reduction gear set 4, and an output drive unit 5.

The casing 1 confines a water compartment 11, and a gear compartment 12 (see FIG. 3) that is partitioned from the water compartment 11. The casing 1 is formed with a water inlet 13 that is in fluid communication with an upper portion of the water compartment 11, and a water outlet 15 that is in fluid communication with a lower portion of the water compartment 11. The water inlet 13 admits pressurized water into the water compartment 11, whereas the water outlet 15 discharges the pressurized water from the water compartment 11. In this embodiment, the water inlet 13 and the water outlet 15 are disposed on a same side of the casing 1 and define parallel first and second axes. The lower portion of the water compartment 11 is formed with a guide plate 19 that inclines downwardly toward the water outlet 15 for guiding water flow through the water outlet 15. In addition, the casing 1 has a bottom side 18 that is formed with a set of insert posts 17.

The rotor 2 is mounted rotatably in the upper portion of the water compartment 11, and has a rotary axis transverse to the first and second axes. The rotor 2 includes an axle portion mounted rotatably to the casing 1, and a plurality of angularly spaced apart curved blades 21 that extend radially and outwardly from the axle portion and that enable the rotor 2 to be driven rotatably by the flow of the pressurized water from the water inlet 13 through the water outlet 15.

The primary drive shaft 3 has a coupling end 31 extending into the water compartment 11 and coupled to the rotor 2 so as to permit co-rotation of the primary drive shaft 3 with the rotor 2, and a meshing end 32 disposed in the gear compartment 12.

The speed-reduction gear set 4 is mounted rotatably in the gear compartment 12, and is coupled to and is driven rotatably by the meshing end 32 of the primary drive shaft 3. The speed-reduction gear set 4 includes coaxial and co-rotatable first and second sprockets 42, 41. The first sprocket 42 meshes with the meshing end 32 of the primary drive shaft 3, and has a diameter larger than that of the primary drive shaft 3. The second sprocket 41 has a diameter smaller than that of the first sprocket 42.

The output drive unit 5 is coupled to and is driven rotatably by the second sprocket 41 of the speed-reduction gear set 4. The output drive unit 5 includes an output shaft 51 and an output gear 52. The output shaft 51 has a gear mounting end that extends rotatably into the gear compartment 12, and an output end 511 that extends outwardly of the casing 1 for supplying drive power. The output gear 52 is disposed in the gear compartment 12, is mounted on the gear mounting end of the output shaft 51, and meshes with the second sprocket 41. The output gear 52 has a diameter larger than that of the second sprocket 41.

Accordingly, when pressurized water flows into the water compartment 11 through the water inlet 13 and impacts the curved blades 21 of the rotor 2, the rotor 2 will be driven to rotate to result in co-rotation of the primary drive shaft 3. Rotation of the primary drive shaft 3 is then transmitted to the output gear 52 through the speed-reduction gear set 4. In view of the speed-reduction gear set 4, the rotary speed is reduced while the output torque is increased. As such, the output power obtained from the output end 511 of the output shaft 51 can be much larger than the input power (a power ratio of as high as 16.8:1 can be achieved in the preferred embodiment). Finally, the pressurized water in the water compartment 11 will be guided by the guide plate 19 to flow through the water outlet 15.

Figure 4:
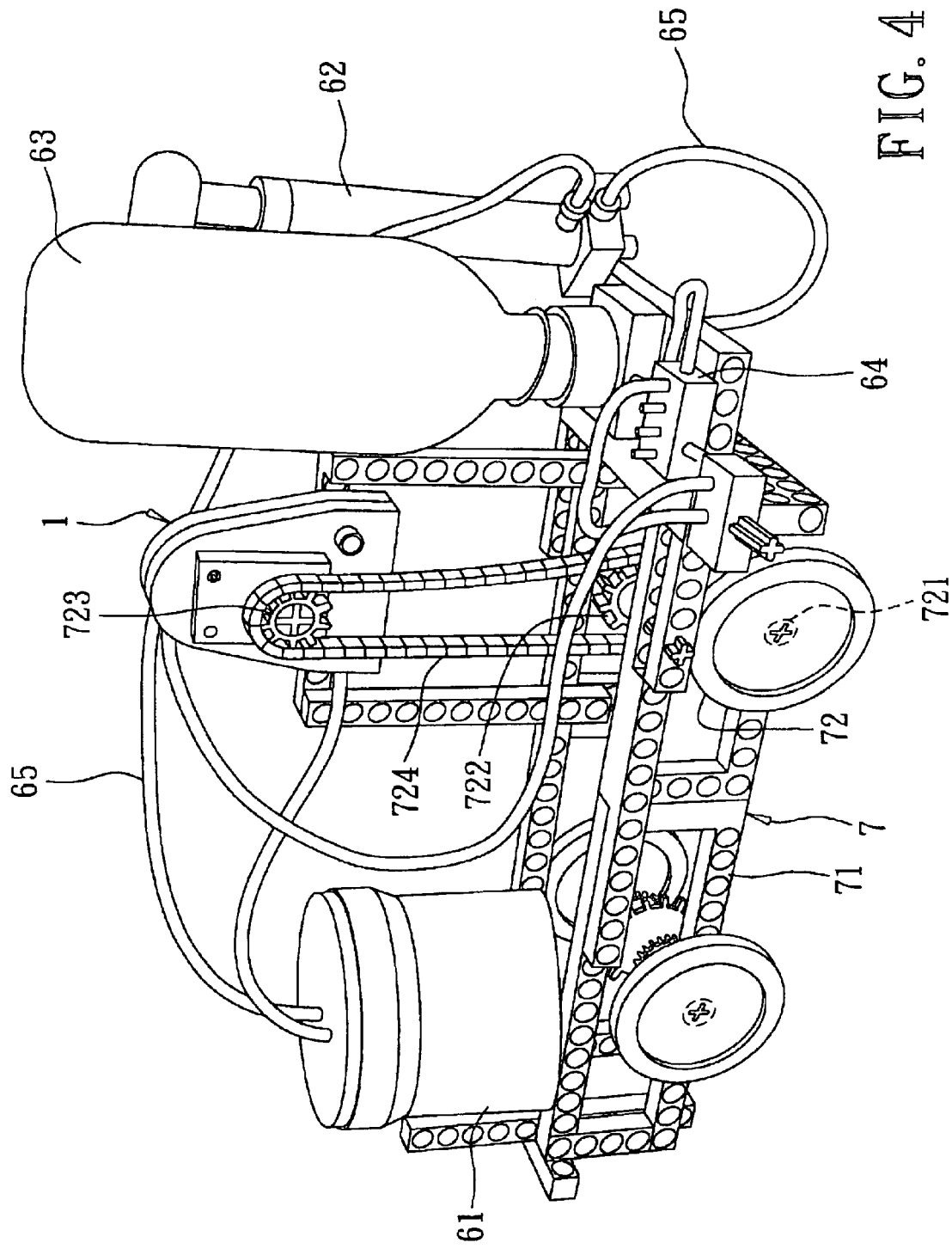
FIG. 4 is a perspective view showing a toy that is built from building blocks and that incorporates the water turbine of the preferred embodiment.

Referring to FIG. 4, the water turbine of the preferred embodiment can be used in combination with a water container 61, a pump 62 for pumping water, a compression box 53 for generating the pressurized water, a switch set 64 for controlling flowing direction of the pressurized water, and a piping arrangement 65 that interconnects the aforesaid members to form a power drive unit for a toy 7 that is made from building blocks. In the example of FIG. 4, the toy 7 is in the form of a car weighing about 700 grams, and includes a car body 71 and a transmission set 72. The transmission set 72 includes a front wheel axle 721, a first gear 722 mounted on the front wheel axle 721, a second gear 723 mounted on the output end 511 of the output shaft 51, and a transmission belt 724 that is trained on the first and second gears 722, 723. Therefore, when the insert posts 17 (see FIG. 2) on the casing 1 are mounted on the car body 71, drive power outputted by the output shaft 51 as a result of the supply of pressurized water to the water turbine of the preferred embodiment, can drive the front wheel axle 721 through the transmission belt 724 such that the car body 71 can move a distance of about 10 meters within a 30-second time period.

Moreover, through the use of transparent materials, the movement of water can be observed for educational demonstration purposes.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. A water turbine, comprising:
   a casing that confines a water compartment and that is formed with a water inlet for admitting pressurized water into said water compartment, and a water outlet for discharging the pressurized water from said water compartment;
   a rotor mounted rotatably in said water compartment and driven rotatably by flow of the pressurized water from said water inlet through said water outlet;
   a primary drive shaft coupled to and co-rotatable with said rotor;
   a speed-reduction gear set coupled to and driven rotatably by said primary drive shaft; and
   an output drive unit coupled to and driven rotatably by said speed-reduction gear set; and
   wherein said water compartment has an upper portion in fluid communication with said water inlet, and a lower portion in fluid communication with said water outlet, said rotor being mounted rotatably in said upper portion of said water compartment, and wherein said lower portion of said water compartment is formed with a guide plate that inclines downwardly toward said water outlet for guiding water flow through said water outlet.

2. The water turbine as claimed in claim 1, wherein said water inlet and said water outlet are disposed on a same side of said casing and define parallel first and second axes, said rotor having a rotary axis transverse to said first and second axes.

3. The water turbine as claimed in claim 1, wherein said rotor includes an axle portion mounted rotatably to said casing, and a plurality of angularly spaced apart curved blades that extend radially and outwardly from said axle portion.

4. The water turbine as claimed in claim 1, wherein said casing further confines a gear compartment that is partitioned from said water compartment,
   said speed-reduction gear set being mounted rotatably in said gear compartment,
   said primary drive shaft having a coupling end extending into said water compartment and coupled to said rotor, and a meshing end disposed in said gear compartment and meshing with said speed-reduction gear set,
   said output drive unit including an output shaft having a gear mounting end that extends rotatably into said gear compartment, and an output end that extends outwardly of said casing for supplying drive power,
   said output drive unit further including an output gear disposed in said gear compartment, mounted on said gear mounting end of said output shaft, and meshing with said speed-reduction gear set.

5. The water turbine as claimed in claim 1, wherein said speed-reduction gear set includes coaxial and co-rotatable first and second sprockets, said first sprocket meshing with said primary drive shaft, said second sprocket meshing with said output drive unit, said first sprocket having a diameter larger than those of said second sprocket and said primary drive shaft.

6. The water turbine as claimed in claim 1, wherein said casing has a bottom side formed with a set of insert posts.

7. A water turbine, comprising:
   a casing that confines a water compartment and that is formed with a water inlet for admitting pressurized water into said water compartment, and a water outlet for discharging the pressurized water from said water compartment;
   a rotor mounted rotatably in said water compartment and driven rotatably by flow of the pressurized water from said water inlet through said water outlet;
   a primary drive shaft coupled to and co-rotatable with said rotor;
   a speed-reduction gear set coupled to and driven rotatably by said primary drive shaft; and
   an output drive unit coupled to and driven rotatably by said speed-reduction gear set; and
   wherein said water compartment has an upper portion in fluid communication with said water inlet, and a lower portion in fluid communication with said water outlet, said rotor being mounted rotatably in said upper portion of said water compartment, and wherein said water inlet and said water outlet are disposed on a same side of said casing and define parallel first and second axes, said rotor having a rotary axis transverse to said first and second axes.

8. A water turbine, comprising:
   a casing that confines a water compartment and that is formed with a water inlet for admitting pressurized water into said water compartment, and a water outlet for discharging the pressurized water from said water compartment;
   a rotor mounted rotatably in said water compartment and driven rotatably by flow of the pressurized water from said water inlet through said water outlet;
   a primary drive shaft coupled to and co-rotatable with said rotor;
   a speed-reduction gear set coupled to and driven rotatably by said primary drive shaft; and
   an output drive unit coupled to and driven rotatably by said speed-reduction gear set; and
   wherein said casing further confines a gear compartment that is partitioned from said water compartment,
   said speed-reduction gear set being mounted rotatably in said gear compartment, said primary drive shaft having a coupling end extending into said water compartment and coupled to said rotor, and a meshing end disposed in said gear compartment and meshing with said speed-reduction gear set, said output drive unit including an output shaft having a gear mounting end that extends rotatably into said gear compartment, and an output end that extends outwardly of said casing for supplying drive power, said output drive unit further including an output gear disposed in said gear compartment, mounted on said gear mounting end of said output shaft, and meshing with said speed-reduction gear set.

9. A water turbine, comprising:

a casing that confines a water compartment and that is formed with a water inlet for admitting pressurized water into said water compartment, and a water outlet for discharging the pressurized water from said water compartment;

a rotor mounted rotatably in said water compartment and driven rotatably by flow of the pressurized water from said water inlet through said water outlet;

a primary drive shaft coupled to and co-rotatable with said rotor;

a speed-reduction gear set coupled to and driven rotatably by said primary drive shaft; and an output drive unit coupled to and driven rotatably by said speed-reduction gear set; and wherein said speed-reduction pear set includes coaxial and co-rotatable first and second sprockets, said first sprocket meshing with said primary drive shaft, said second sprocket meshing with said output drive unit, said first sprocket having a diameter larger than those of said second sprocket and said ordinary drive shaft.

10. A water turbine, comprising:

a casing that confines a water compartment and that is formed with a water inlet for admitting pressurized water into said water compartment, and a water outlet for discharging the pressurized water from said water compartment;

a rotor mounted rotatably in said water compartment and driven rotatably by flow of the pressurized water from said water inlet through said water outlet;

a primary drive shaft coupled to and co-rotatable with said rotor;

a speed-reduction gear set coupled to and driven rotatably by said primary drive shaft; and an output drive unit coupled to and driven rotatably by said speed-reduction gear set; and wherein said casing has a bottom side formed with a set of insert posts.

* * * * *